(12) United States Patent
Takaso

(10) Patent No.: US 11,814,031 B2
(45) Date of Patent: Nov. 14, 2023

(54) DRIVING ASSISTANCE APPARATUS

(71) Applicant: SUBARU CORPORATION, Tokyo (JP)

(72) Inventor: Yasushi Takaso, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 256 days.

(21) Appl. No.: 17/306,549

(22) Filed: May 3, 2021

(65) Prior Publication Data

US 2021/0380093 A1 Dec. 9, 2021

(30) Foreign Application Priority Data

Jun. 3, 2020 (JP) .................................. 2020-096968

(51) Int. Cl.
 *B60W 20/10* (2016.01)
 *B60W 10/08* (2006.01)
 (Continued)

(52) U.S. Cl.
 CPC ............. *B60W 20/10* (2013.01); *B60K 6/387* (2013.01); *B60K 6/547* (2013.01); *B60W 10/06* (2013.01);
 (Continued)

(58) Field of Classification Search
 CPC ...... B60W 20/10; B60W 10/06; B60W 10/08; B60W 30/165; B60W 30/182; B60W 2510/0208; B60W 2510/101; B60W 2520/10; B60W 2554/406; B60W 2710/06; B60W 2710/08; B60W 30/18063; B60W 2540/14; B60W 2540/16; B60W 10/02; B60K 6/387; B60K 2006/4808; B60Y 2300/182; B60Y 2400/71; Y02T 10/62
 (Continued)

(56) References Cited

U.S. PATENT DOCUMENTS 10,308,138 B2 * 6/2019 Meyer ...................... B60K 6/54
2003/0221881 A1 * 12/2003 Lee .................. B60W 30/18118
 903/917

(Continued)

FOREIGN PATENT DOCUMENTS

JP 2005-028968 A 2/2005
WO WO-2014170749 A1 * 10/2014 ............... B60K 6/48

*Primary Examiner* — Sizo B Vilakazi
*Assistant Examiner* — Brian R Kirby
(74) *Attorney, Agent, or Firm* — McDermott Will & Emery LLP

(57) ABSTRACT

A driving assistance apparatus includes a clutch provided between a drive source and a transmission, a clutch operator with which a driver who drives a vehicle disengages the clutch, a clutch operation detector that detects that the clutch is disengaged, a shift operator with which the driver sets the transmission at least to a neutral position, a shift position detector that detects that the transmission is in the neutral position, a low-speed motor, and a controller that controls a (Continued)

drive force of the low-speed motor. The controller includes a driving mode setter that sets a driving mode of the vehicle to a motor driving mode when the clutch is detected to be disengaged or the transmission is detected to be in the neutral position. The controller stops the drive source and starts the low-speed motor when the driving mode is set to the motor driving mode.

13 Claims, 7 Drawing Sheets

(51) Int. Cl.
*B60W 30/165* (2020.01)
*B60K 6/387* (2007.10)
*B60K 6/547* (2007.10)
*B60W 10/06* (2006.01)
*B60W 30/182* (2020.01)

(52) U.S. Cl.
CPC .......... *B60W 10/08* (2013.01); *B60W 30/165* (2013.01); *B60W 30/182* (2013.01); *B60W 2510/0208* (2013.01); *B60W 2510/101* (2013.01); *B60W 2520/10* (2013.01); *B60W 2554/406* (2020.02); *B60W 2710/06* (2013.01); *B60W 2710/08* (2013.01); *B60Y 2200/92* (2013.01); *B60Y 2300/182* (2013.01)

(58) Field of Classification Search
USPC .......................................................... 701/22
See application file for complete search history.

(56) References Cited

U.S. PATENT DOCUMENTS

| | | | |
|---|---|---|---|
| 2005/0216169 A1* | 9/2005 | Arai | B60W 30/17 180/170 |
| 2006/0095194 A1* | 5/2006 | Arai | B60W 30/18018 701/96 |
| 2010/0076634 A1* | 3/2010 | Brigham | B60W 30/18018 903/930 |
| 2010/0089673 A1* | 4/2010 | Wisniewski | B60W 10/026 180/65.285 |
| 2013/0325273 A1* | 12/2013 | Reuter | B60W 10/02 701/54 |
| 2015/0360672 A1* | 12/2015 | Hayashima | B60W 30/18027 180/65.265 |
| 2017/0053534 A1* | 2/2017 | Lokesh | H04L 67/12 |
| 2017/0072943 A1* | 3/2017 | Pedlar | B60K 6/36 |
| 2017/0249848 A1* | 8/2017 | Niino | B60W 30/17 |
| 2017/0327005 A1* | 11/2017 | Meyer | B60L 15/2063 |
| 2018/0099673 A1* | 4/2018 | Pedlar | B60W 10/08 |
| 2018/0222480 A1* | 8/2018 | Shokonji | B60W 40/04 |
| 2018/0264973 A1* | 9/2018 | Mochizuki | B60K 6/48 |
| 2019/0210600 A1* | 7/2019 | Etori | B60R 21/00 |
| 2020/0180602 A1* | 6/2020 | Jeong | B60W 20/20 |
| 2020/0290615 A1* | 9/2020 | Kato | B60W 50/14 |

\* cited by examiner

DRIVING ASSISTANCE APPARATUS

CROSS-REFERENCE TO RELATED APPLICATIONS

The present application claims priority from Japanese Patent Application No. 2020-096968 filed on Jun. 3, 2020, the entire contents of which are hereby incorporated by reference.

BACKGROUND

The disclosure relates to a driving assistance apparatus configured such that a vehicle travels with a drive force from a drive source during normal driving, and vehicle-to-vehicle follow distance control is executed at a low speed of the vehicle while switching a traveling mode to a mode using an electric motor.

Many sporty vehicles employ manual transmissions (hereinafter referred to as "MT vehicles") to allow their drivers to operate accelerators and change shift positions as intended, thereby providing good operation feeling.

Many vehicles also employ automatic transmissions (hereinafter referred to as "AT vehicles") to automatically set an appropriate speed ratio (shift stage) depending on a vehicle speed and a load on a drive source, thereby reducing driver's cumbersome work to change a shift position. Thus, driving is facilitated.

When the MT vehicle slowly moves by repeating start and stop in a traffic jam, the driver may have a burden because the driver repeatedly operates a brake, an accelerator, and a clutch and change the shift position in a short time. During a traffic jam at a hill, the driver's burden may increase because the driver starts the vehicle on the hill.

The AT vehicle creeps during a stop. The driver continues to depress a brake pedal forcefully during the stop to prevent the driver's vehicle from moving unintendedly. However, the driver's burden may increase because the driver continues to depress the brake pedal forcefully for a relatively long time during a stop in a traffic jam.

During the stop in a traffic jam, some drivers set a neutral shift position (N) to interrupt power transmission between the drive source and wheels, thereby reducing the force to depress the brake pedal. Alternatively, some drivers set the neutral shift position (N) and operate a parking brake to keep the vehicle stopped.

The driver of the AT vehicle may forget to return the shift position to a driving shift position when starting the vehicle in a traffic jam because the driver does not frequently change the shift position. If the accelerator pedal is depressed in this state, the drive source idles and the vehicle is still stopped. Therefore, the driver may be upset.

For example, Japanese Unexamined Patent Application Publication (JP-A) No. 2005-28968 discloses a technology in which select positions for a driving mode using a drive force of a motor alone (0.5th gear and −0.5th gear) are set as shift stages of a manual transmission of an MT vehicle.

According to the technology disclosed in JP-A No. 2005-28968, the driver operates a select lever of the transmission (hereinafter referred to simply as "select lever") during a traffic jam to select either one of 0.5th gear and −0.5th gear. Thus, the driving mode is switched from an engine drive mode to a motor drive mode and the vehicle travels through the drive of the motor. Accordingly, the burden on the driver of the MT vehicle can be reduced during the traffic jam.

SUMMARY

An aspect of the disclosure provides a driving assistance apparatus for a vehicle. The driving assistance apparatus includes a clutch, a clutch operator, a clutch operation detector, a shift operator, a shift position detector, a low-speed motor, and a controller. The clutch is provided between a drive source and a transmission. The clutch operator is used by a driver who drives the vehicle to disengage the clutch. The clutch operation detector is configured to detect that the clutch is disengaged by the clutch operator. The shift operator is used by the driver for an operation to set the transmission at least to a neutral position. The shift position detector is configured to detect that the transmission is in the neutral position through the operation on the shift operator. The controller is configured to control a drive force of the low-speed motor. The controller includes a driving mode setter configured to set a driving mode of the vehicle to a motor driving mode when the clutch operation detector detects that the clutch is disengaged or the shift position detector detects that the transmission is in the neutral position. The controller is configured to stop the drive source and start the low-speed motor when the driving mode setter sets the driving mode to the motor driving mode.

An aspect of the disclosure provides a driving assistance apparatus for a vehicle. The driving assistance apparatus includes a clutch, a clutch operator, a clutch operation detector, a shift operator, a shift position detector, a motor, and circuitry. The clutch is provided between a drive source and a transmission. The clutch operator is used by a driver who drives the vehicle to disengage the clutch. The clutch operation detector is configured to detect that the clutch is disengaged by the clutch operator. The shift operator is used by the driver for an operation to set the transmission at least to a neutral position. The shift position detector is configured to detect that the transmission is in the neutral position through the operation on the shift operator. The circuitry is configured to control a drive force of the motor. The circuitry is configured to set a driving mode of the vehicle to a motor driving mode when the clutch operation detector detects that the clutch is disengaged or the shift position detector detects that the transmission is in the neutral position. The circuitry is configured to stop the drive source and start the motor when the driving mode is set to the motor driving mode.

BRIEF DESCRIPTION OF THE DRAWINGS

The accompanying drawings are included to provide a further understanding of the disclosure and are incorporated in and constitute a part of this specification. The drawings illustrate an embodiment and, together with the specification, serve to explain the principles of the disclosure.

DETAILED DESCRIPTION

In the technology disclosed in JP-A No. 2005-28968, the driving mode of the MT vehicle is switched to the motor drive mode when the vehicle is traveling at a very low speed by setting the shift stage to either one of 0.5th gear and −0.5th gear.

The vehicle speed during a traffic jam is not always the very low speed but may be higher than the very low speed. In JP-A No. 2005-28968, when the vehicle travels at a speed higher than the very low speed during the traffic jam, the driver is prompted to change the shift position by being notified about switching of the driving mode to the engine drive mode.

In order that the driver's vehicle may follow a preceding vehicle during the traffic jam, the driver changes the shift position and operates the clutch, the select lever, and the accelerator similarly to general MT vehicles. Therefore, there is a possibility of a limit to reduce the burden on the driver during operations in the traffic jam.

A driver of an AT vehicle stopped at a neutral shift position in a traffic jam may depress an accelerator pedal while forgetting to return the shift position to a driving shift position when starting the vehicle to follow a preceding vehicle. Then, the drive source idles and the vehicle is still stopped. Therefore, the driver may be upset.

It is desirable to provide a driving assistance apparatus capable of reducing the burdens on the drivers of both the MT vehicle and the AT vehicle during operations in the traffic jam.

In the following, an embodiment of the disclosure is described in detail with reference to the accompanying drawings. Note that the following description is directed to an illustrative example of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following embodiment which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

Figure 1:
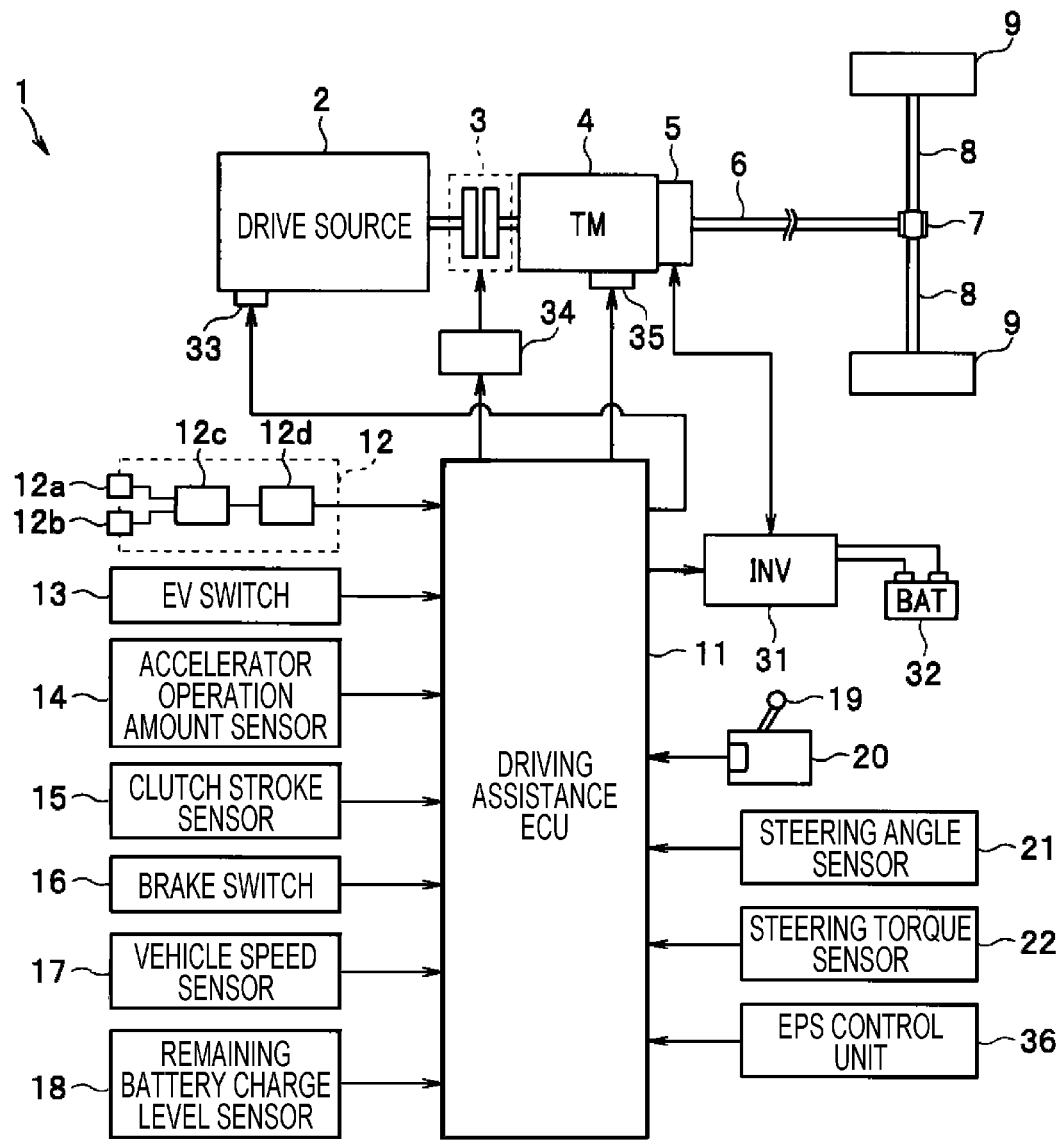
FIG. 1 is a schematic diagram illustrating an overall structure of a driving assistance apparatus and a power train.

In FIG. 1, reference symbol 1 represents a power train of a vehicle (driver's vehicle). Driving wheels 9 are coupled to the power train 1 via a clutch 3, a transmission 4, a low-speed motor generator (hereinafter abbreviated as "low-speed M/G") 5, a propeller shaft 6, a differential gearbox 7, and right and left axles 8 in order from a drive source 2.

The drive source 2 is either one of an engine and an electric motor for traveling. Power output from the drive source 2 is transmitted to the transmission 4 via the clutch 3. The transmission 4 is either one of a manual transmission (MT) and an automatic transmission (AT). The low-speed M/G 5 coupled to an output side of the transmission 4 exerts its function while the clutch 3 is disengaged. The vehicle may have a parallel mode in which the low-speed M/G 5 is driven to assist start acceleration when the clutch 3 is engaged and the vehicle starts with the power output from the drive source 2.

Reference symbol 11 represents a driving assistance control unit (driving assistance ECU). In one embodiment of the disclosure, the driving assistance ECU 11 serves as a controller. The driving assistance ECU 11 includes an integrated circuit and a peripheral circuit. The integrated circuit includes a known CPU, a known RAM, a known ROM, and a known non-volatile memory. The ROM prestores fixed data such as programs to be executed by the CPU, tables, and maps.

A camera unit 12, an EV switch 13, an accelerator operation amount sensor 14, and a clutch stroke sensor 15 are coupled to an input side of the driving assistance ECU 11. The EV switch 13 is turned ON when the driver constantly permits traveling in a motor driving (EV) mode in which the vehicle travels through power running by the low-speed M/G 5. The accelerator operation amount sensor 14 detects an amount of depression of an accelerator pedal by the driver. In one embodiment of the disclosure, the accelerator pedal serves as an accelerator operator. The clutch stroke sensor 15 detects an amount of depression of a clutch pedal. In one embodiment of the disclosure, the clutch stroke sensor 15 serves as a clutch operation detector, and the clutch pedal serves as a clutch operator.

A brake switch 16, a vehicle speed sensor 17, a remaining battery charge level sensor 18, and a position sensor 20 are also coupled to the input side of the driving assistance ECU 11. The brake switch 16 is turned ON in response to depression of a brake pedal. In one embodiment of the disclosure, the brake pedal serves as a brake operator. The vehicle speed sensor 17 detects a speed of the driver's vehicle (driver's vehicle speed). In one embodiment of the disclosure, the vehicle speed sensor 17 serves as a vehicle speed detector. The remaining battery charge level sensor 18 detects a remaining battery charge level, that is, a state of charge (SOC). The position sensor 20 detects a shift position of a select lever 19. In one embodiment of the disclosure, the position sensor 20 serves as a shift position detector, and the select lever 19 serves as a shift operator.

A steering angle sensor 21 and a steering torque sensor 22 are also coupled to the input side of the driving assistance ECU 11. The steering angle sensor 21 detects a steering angle of a steering wheel. The steering torque sensor 22 detects a steering torque applied to a steering shaft through a driver's steering operation.

The camera unit 12 includes a stereo-camera, an image processing unit (IPU) 12c, and a driving environment recognizer 12d. The stereo-camera includes a main camera 12a and a sub-camera 12b having imaging elements such as either one of a CCD and a CMOS. The camera unit 12 acquires reference image data by using the main camera 12a and comparative image data by using the sub-camera 12b.

The IPU 12c processes the reference image data and the comparative image data through predetermined image processing. The driving environment recognizer 12d reads the reference image data and the comparative image data processed by the IPU 12c, recognizes identical objects in both images based on parallax, and calculates data on a distance from the driver's vehicle to the object by using the principle of triangulation, thereby recognizing a forward driving environment. The objects acquired from information on the forward driving environment include a following-target preceding vehicle traveling immediately ahead of the driver's vehicle.

The low-speed M/G 5 and a battery 32 are coupled to an output side of the driving assistance ECU 11 via an inverter 31. For example, the driving assistance ECU 11 controls the inverter 31 through PWM. During power running, the driving assistance ECU 11 drives the low-speed M/G 5 by supplying electric power of the battery 32 to the low-speed M/G 5 via the inverter 31.

During coasting, the driving assistance ECU 11 regenerates electric power in the battery 32 by causing the low-speed M/G 5 to generate a regenerative torque (negative torque) as a predetermined regeneration amount via the inverter 31. Thus, the low-speed M/G 5 can selectively operate both for power running and for electric power regeneration through the control on the inverter 31 by the driving assistance ECU 11.

This embodiment employs a drive-by-wire system in which the accelerator pedal (not illustrated), the clutch pedal (not illustrated), and the select lever 19 are not directly coupled to the drive source 2, the clutch 3, and the transmission 4, respectively. Therefore, a drive source actuator 33, a clutch actuator 34, and a transmission actuator 35 are coupled to the output side of the driving assistance ECU 11 to operate the drive source 2, the clutch 3, and the transmission 4, individually.

An electric power steering (EPS) control unit 36 is coupled to the driving assistance ECU 11 so that the EPS control unit 36 and the driving assistance ECU 11 are communicable bidirectionally. The EPS control unit 36 assists the driver's steering operation by driving an EPS motor (not illustrated) coupled to the steering shaft based on the steering angle detected by the steering angle sensor 21 and the steering torque detected by the steering torque sensor 22.

The driving assistance ECU 11 has functions of cruise control with automatic vehicle-to-vehicle distance keeping control (adaptive cruise control: ACC) described later, and lane keeping control (active lane keep: ALK). In the ALK control, a steering control torque for controlling a position of the driver's vehicle in a lateral direction (lateral position) during traveling is set so that the driver's vehicle travels along a current lane. A target course to be set as the lateral position is determined based on, for example, any one of a center between right and left lane marking lines, a position offset by a predetermined distance from the center between the right and left lane marking lines, and a path of a preceding vehicle. Those parameters are selectively used as appropriate depending on, for example, a driving environment.

The EPS control unit 36 executes steering control by driving the EPS motor and applying, to the steering shaft, the steering control torque that is set by the ALK control function.

The driving assistance ECU 11 transmits, to the drive source actuator 33, a drive signal that is based on an amount of depression of the accelerator pedal by the driver, which is detected by the accelerator operation amount sensor 14, and drives the drive source actuator 33 to control power to be output from the drive source 2 (either one of the engine and the electric motor for traveling). The driving assistance ECU 11 transmits, to the clutch actuator 34, a clutch control signal that is based on an amount of depression of the clutch pedal by the driver, which is detected by the clutch stroke sensor 15, and operates the clutch actuator 34 to engage, halfway engage, or disengage the clutch 3.

The driving assistance ECU 11 operates the transmission 4 to shift speeds based on a position of the select lever 19 set by the driver and detected by the position sensor 20. When the driving assistance ECU 11 determines, based on a signal from the position sensor 20, that the driver has set the select lever 19 to a neutral position, the driving assistance ECU 11 operates the transmission actuator 35 to set the shift stage of the transmission 4 to neutral.

The driving assistance ECU 11 makes determination about the driving mode. In this embodiment, a normal driving mode using the drive source 2 and a low-speed EV mode using the low-speed M/G 5 are provided as the driving mode. In one embodiment of the disclosure, the low-speed EV mode serves as a motor driving mode. When the shift stage of the transmission 4 is neutral (N) or the clutch 3 is disengaged and the vehicle is traveling at a driver's vehicle speed Vs equal to or lower than a traffic jam determination vehicle speed Vth, the driving assistance ECU 11 switches the driving mode from the normal driving mode to the low-speed EV mode.

Figure 2:
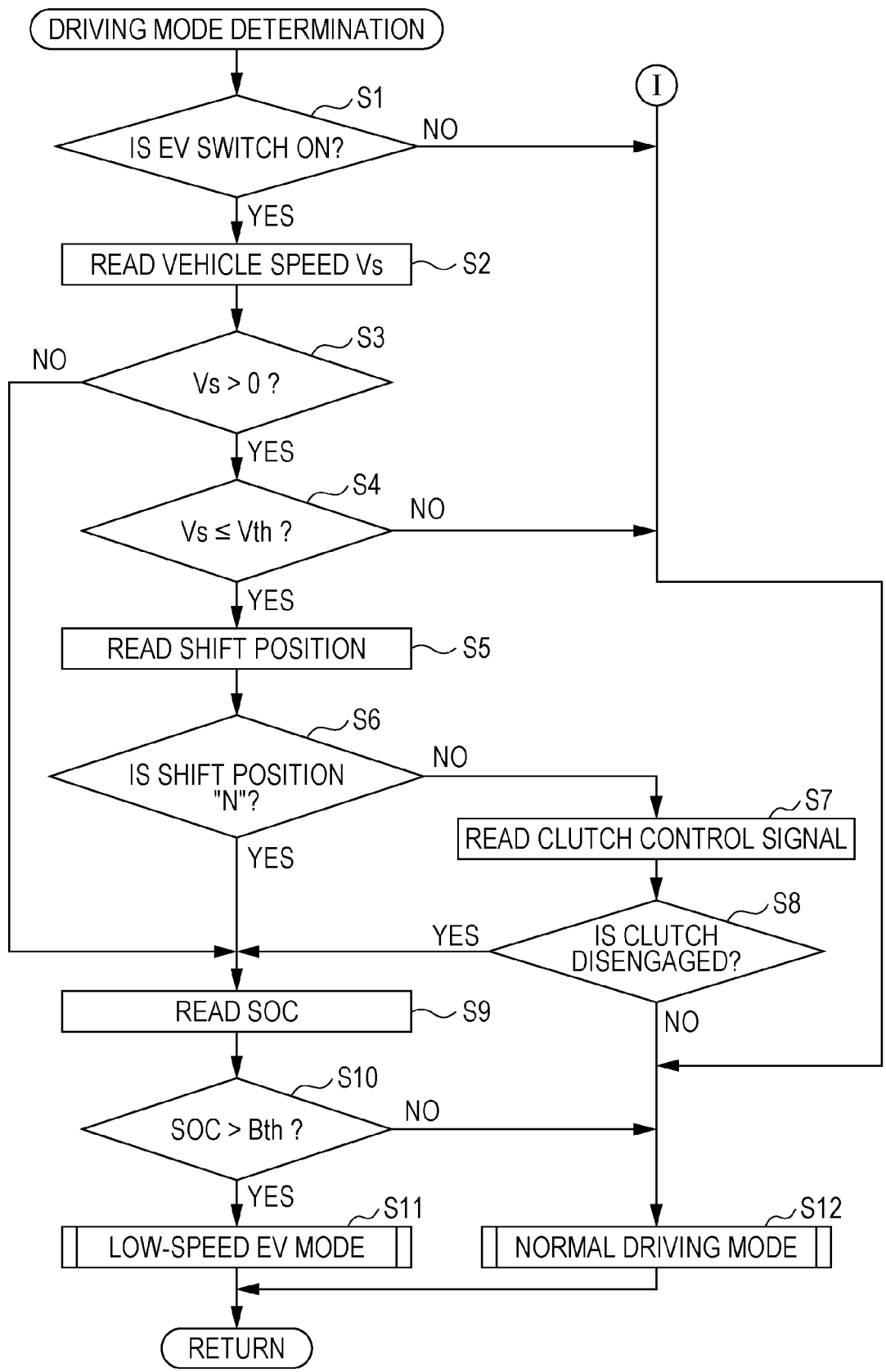
FIG. 2 is a flowchart illustrating a driving mode determination routine.

In one example, the driving assistance ECU 11 executes a driving mode determination process along a driving mode determination routine illustrated in FIG. 2. In one embodiment of the disclosure, the process in this routine serves as a driving mode setter.

In this routine, the driving assistance ECU 11 first determines in Step S1 whether the EV switch 13 is ON. When the EV switch 13 is OFF, the driving assistance ECU 11 determines that the driver does not permit the EV mode, and jumps to Step S12 to execute the normal driving mode. When the EV switch 13 is ON, the driving assistance ECU 11 proceeds to Step S2.

In Step S2, the driving assistance ECU 11 reads a driver's vehicle speed Vs detected by the vehicle speed sensor 17, and determines in Step S3 whether the driver's vehicle is traveling. When the driving assistance ECU 11 determines that the driver's vehicle is traveling (Vs>0), the driving assistance ECU 11 proceeds to Step S4. When the driving assistance ECU 11 determines that the driver's vehicle is stopped (Vs=0), the driving assistance ECU 11 jumps to Step S9.

In Step S4, the driving assistance ECU 11 determines whether the driver's vehicle speed Vs is equal to or lower than the traffic jam determination vehicle speed Vth. The traffic jam determination vehicle speed Vth is an upper limit of a vehicle speed generally regarded as a speed in a traffic jam. In this embodiment, the traffic jam determination vehicle speed Vth is set to about 30 [Km/h] to about 50 [Km/h]. When Vs>Vth, the driving assistance ECU 11 jumps to Step S12. When Vs≤Vth, the driving assistance ECU 11 determines that a traffic jam has occurred, and proceeds to Step S5.

In Step S5, the driving assistance ECU 11 reads a set position of the select lever 19 detected by the position sensor 20, and determines in Step S6 whether the set shift position of the select lever 19 is neutral (N).

When the transmission 4 is a manual transmission, the position sensor 20 detects a state in which the select lever 19 is set to any shift position out of first to sixth gears and reverse gear as well as neutral (N). When the transmission 4 is an automatic transmission, the position sensor 20 detects a state in which the select lever 19 is set to any shift range out of parking (P), reverse (R), and drive (D) as well as neutral (N).

When the driving assistance ECU 11 determines that the select lever 19 is set to a position other than neutral (N), the driving assistance ECU 11 proceeds to Step S7. When the driving assistance ECU 11 determines that the select lever 19 is set to neutral (N), the driving assistance ECU 11 proceeds to Step S9.

In Step S7, the driving assistance ECU 11 reads a clutch control signal output from the driving assistance ECU 11 to the clutch actuator 34. The clutch control signal corresponds to a clutch stroke that is an amount of depression of the clutch pedal, which is detected by the clutch stroke sensor 15.

In Step S8, the driving assistance ECU 11 determines whether the clutch 3 is disengaged based on the clutch control signal. Whether the clutch 3 is disengaged may be determined directly based on the clutch stroke detected by the clutch stroke sensor 15.

When the driving assistance ECU 11 determines that the clutch 3 is disengaged, the driving assistance ECU 11 proceeds to Step S9. When the driving assistance ECU 11 determines that the clutch 3 is engaged, the driving assistance ECU 11 proceeds to Step S12. When the driving assistance ECU 11 proceeds to Step S9 from any one of Steps S3, S6, and S8, the driving assistance ECU 11 reads a remaining charge level SOC of the battery 32 detected by the remaining battery charge level sensor 18.

In Step S10, the driving assistance ECU 11 compares the remaining battery charge level SOC and a remaining charge level determination value Bth. The remaining charge level determination value Bth is a value based on which the driving assistance ECU 11 determines whether the vehicle can continue to travel by using the low-speed M/G 5 as the drive source when the driving mode is switched to the low-speed EV mode. For example, the remaining charge level determination value Bth is preset through experiments.

When SOC>Bth, the driving assistance ECU 11 determines that the vehicle can continue to travel by using the low-speed M/G 5, and proceeds to Step S11. When SOC≤Bth, the driving assistance ECU 11 determines that the remaining battery charge level is insufficient, and proceeds to Step S12 to execute the normal driving mode.

When the driving assistance ECU 11 proceeds to Step S11 from Step S10, the driving assistance ECU 11 executes the low-speed EV mode and terminates the routine. When the driving assistance ECU 11 proceeds to Step S12 from any one of Steps S1, S4, S8, and S10 and Step S27 described later, the driving assistance ECU 11 executes the normal driving mode and terminates the routine.

Figure 3:
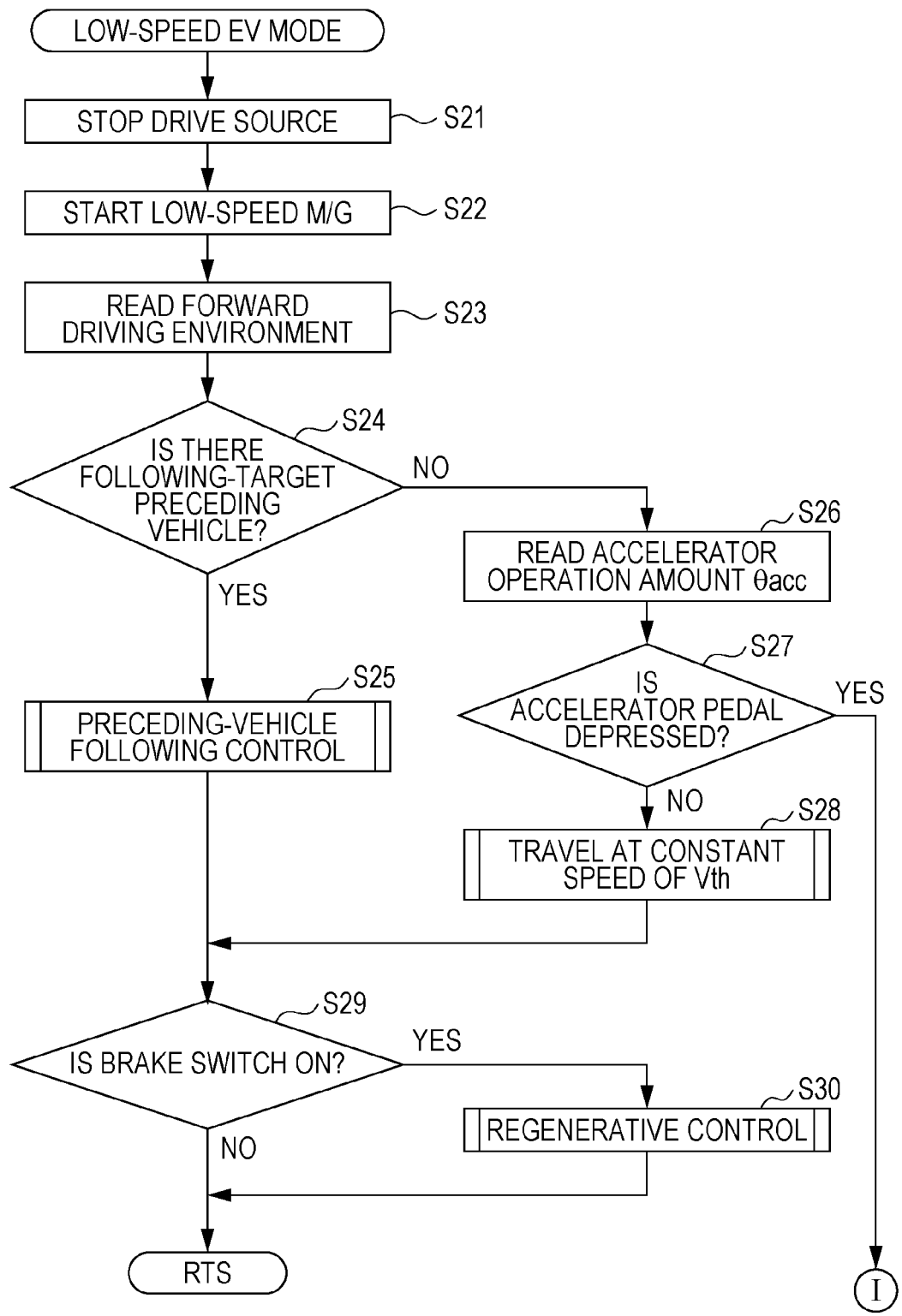
FIG. 3 is a flowchart illustrating a low-speed EV mode routine.

In Step S11, the low-speed EV mode is executed through a process along a low-speed EV mode subroutine illustrated in FIG. 3. In this subroutine, the driving assistance ECU 11 first stops the drive source 2 in Step S21 by interrupting energization of the drive source actuator 33. In Step S22, the driving assistance ECU 11 starts the low-speed M/G 5 and proceeds to Step S23.

In Step S23, the driving assistance ECU 11 reads a forward driving environment recognized by the driving environment recognizer 12d of the camera unit 12, and determines in Step S24 whether a following-target preceding vehicle is present ahead of the driver's vehicle based on the forward driving environment. When the following-target preceding vehicle is detected, the driving assistance ECU 11 proceeds to Step S25. When the following-target preceding vehicle is not detected, the driving assistance ECU 11 proceeds to Step S26.

In Step S25, the driving assistance ECU 11 executes preceding-vehicle following control and proceeds to Step S29. The preceding-vehicle following control is executed through the known cruise control with automatic vehicle-to-vehicle distance keeping control (adaptive cruise control: ACC). In the preceding-vehicle following control, the driver's vehicle is caused to follow the following-target preceding vehicle at a vehicle speed equal to or lower than the traffic jam determination vehicle speed Vth while keeping a predetermined distance between the vehicles. During the preceding-vehicle following control, either one of a target acceleration and a target deceleration is set based on, for example, preceding vehicle information such as a speed of the driver's vehicle relative to a speed of the preceding vehicle, and a speed deviation between the driver's vehicle speed and the preceding vehicle speed. A request torque is determined based on either one of the target acceleration and the target deceleration, and electric power that meets the request torque is supplied from the battery 32 to the low-speed M/G 5 via the inverter 31 to perform power running. Alternatively, the driver's vehicle is decelerated through, for example, regenerative brake control.

When the driving assistance ECU 11 proceeds to Step S26 from Step S24, the driving assistance ECU 11 reads an accelerator operation amount θacc detected by the accelerator operation amount sensor 14, and proceeds to Step S27 to determine whether the driver is depressing the accelerator pedal based on the accelerator operation amount θacc. In a released state in which the driver is not depressing the accelerator pedal (θacc=0), the driving assistance ECU 11 proceeds to Step S28. When the driver is depressing the accelerator pedal (θacc>0), the driving assistance ECU 11 returns to Step S12 of FIG. 2.

In Step S28, the driving assistance ECU 11 sets the traffic jam determination vehicle speed Vth as a target vehicle speed Vt because the following-target preceding vehicle is not detected. To cause the driver's vehicle to travel at a constant speed that is the target vehicle speed Vt, electric power of the battery 32 is supplied to the low-speed M/G 5 via the inverter 31 to generate a drive force. Then, the driving assistance ECU 11 proceeds to Step S29.

When the driving assistance ECU 11 proceeds to Step S29 from either one of Steps S25 and S28, the driving assistance ECU 11 determines whether the brake switch 16 is ON. When the brake switch 16 is ON, the driving assistance ECU 11 determines that the driver is depressing the brake pedal, and proceeds to Step S30. When the brake switch 16 is OFF, the driving assistance ECU 11 determines that the driver is releasing the brake pedal, and terminates the routine.

In Step S30, the driving assistance ECU 11 executes regenerative control and terminates the routine. In the regenerative control, the driving assistance ECU 11 outputs, to the inverter 31, a regenerative control signal for causing the low-speed M/G 5 to generate a predetermined regenerative torque, and regenerates electric power in the battery 32 by causing the low-speed M/G 5 to perform a regenerative operation.

When the driving assistance ECU 11 proceeds to Step S12 from any one of Steps S1, S4, S8, S10, and S27, the normal driving mode is executed. When the transmission 4 is a manual transmission, the normal driving mode is executed through a process along a normal driving mode (MT) subroutine illustrated in FIG. 4 and FIG. 5. When the transmission 4 is an automatic transmission, the normal driving mode is executed through a process along a normal driving mode (AT) subroutine illustrated in FIG. 6 and FIG. 7.

Figure 4:
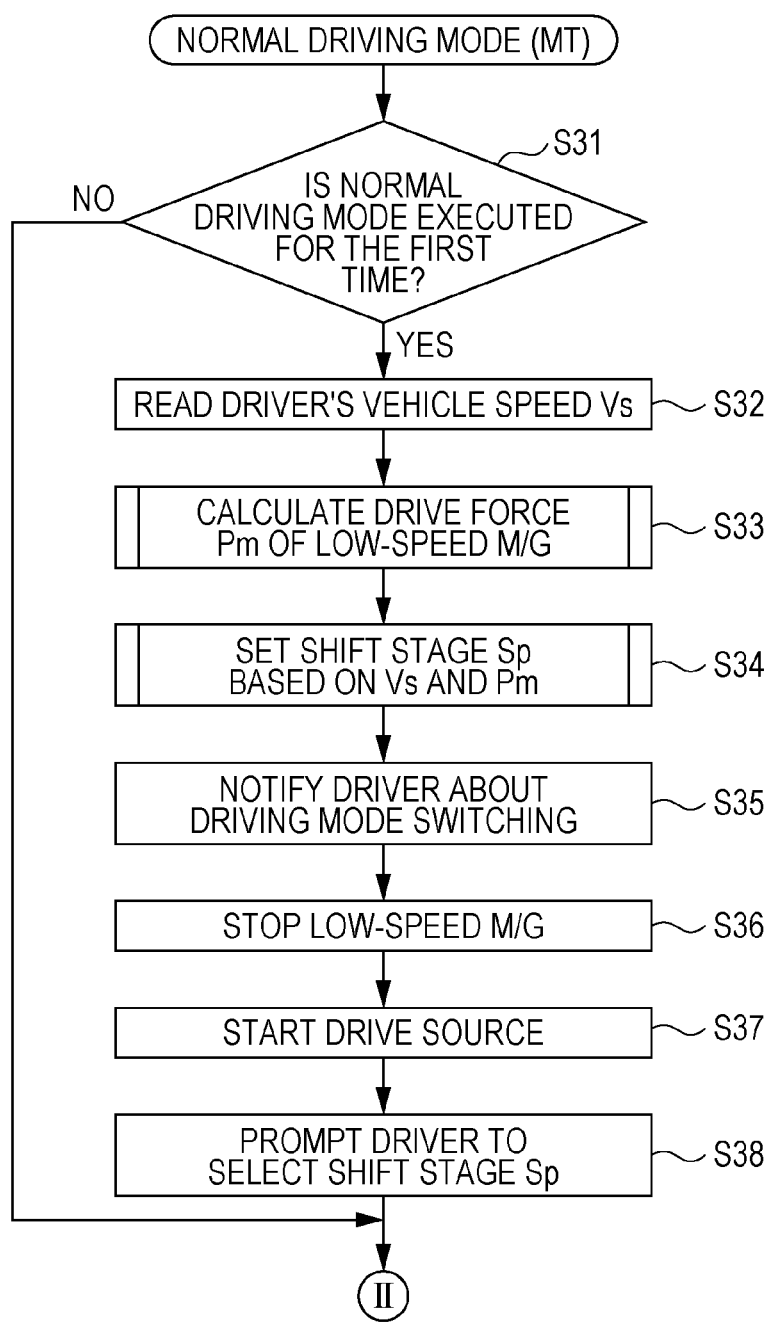
FIG. 4 is a flowchart (part 1) illustrating a normal driving mode routine in an MT vehicle.
Figure 5:
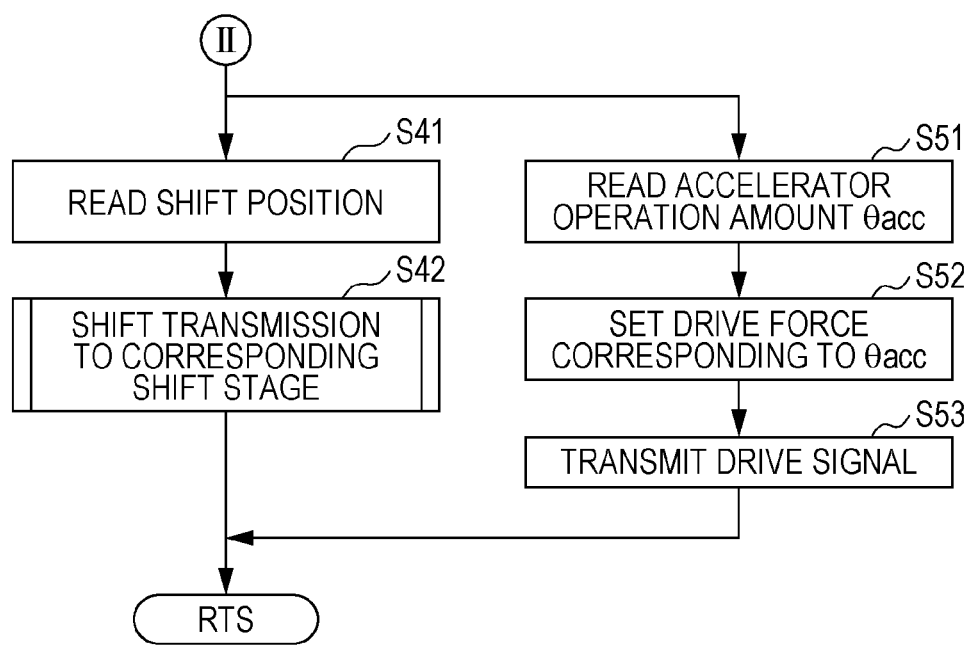
FIG. 5 is a flowchart (part 2) illustrating the normal driving mode routine in the MT vehicle.

First, the normal driving mode (MT) subroutine illustrated in FIG. 4 and FIG. 5 is described. In this subroutine, the driving assistance ECU 11 first determines in Step S31 whether the routine is executed for the first time after the low-speed EV mode is switched to the normal driving mode. When the routine is executed for the first time, the driving assistance ECU 11 proceeds to Step S32. When the routine is executed for the second time or subsequently, the driving assistance ECU 11 jumps to Steps S41 and S51.

In Step S32, the driving assistance ECU 11 reads a driver's vehicle speed Vs detected by the vehicle speed sensor 17. In Step S33, the driving assistance ECU 11 calculates a drive force Pm of the low-speed M/G 5 based on electric power supplied to the low-speed M/G 5 via the inverter 31 during the execution of the low-speed EV mode. In Step S34, the driving assistance ECU 11 determines an appropriate shift stage Sp of the transmission (manual transmission) 4 by referring to a preset map based on the driver's vehicle speed Vs and the drive force Pm of the low-speed M/G 5. Alternatively, the driving assistance ECU 11 determines the appropriate shift stage Sp through calculation based on the driver's vehicle speed Vs, the drive force Pm of the low-speed M/G 5, and a speed ratio εp of each shift stage.

In Step S35, the driving assistance ECU 11 notifies the driver about switching of the driving mode from the low-speed EV mode to the normal driving mode by using a monitor (not illustrated) and voice. In Step S36, the driving assistance ECU 11 stops the low-speed M/G 5. In Step S37, the driving assistance ECU 11 starts the drive source 2. In Step S38, the appropriate shift stage Sp is displayed on the monitor and the like to prompt the driver to change the shift position. The driving assistance ECU 11 waits until the driver's shift position change is detected based on a signal from the position sensor 20.

When the driver recognizes the shift stage Sp displayed on the monitor and the like, the driver first depresses the clutch pedal and shifts the select lever 19 based on the displayed shift stage Sp. When the driving assistance ECU 11 detects the depression of the clutch pedal based on a signal from the clutch stroke sensor 15, the driving assistance ECU 11 transmits a drive signal to the clutch actuator 34 and operates the clutch actuator 34 to disengage the clutch 3.

When the driving assistance ECU 11 detects the driver's operation for shifting the select lever 19, the driving assistance ECU 11 proceeds to Steps S41 and S51. In Step S41, the driving assistance ECU 11 reads a shift position of the select lever 19 detected by the position sensor 20. In Step S42, the driving assistance ECU 11 operates the transmission actuator 35 to change the shift stage of the transmission (manual transmission) 4 to the shift stage corresponding to the shift position of the select lever 19. Then, the driving assistance ECU 11 terminates the routine.

When the driving assistance ECU 11 detects release of the clutch pedal based on a signal from the clutch stroke sensor 15, the driving assistance ECU 11 transmits an OFF signal to the clutch actuator 34 to engage the clutch 3. Thus, the drive force of the drive source 2 is transmitted to the transmission (manual transmission) 4 via the clutch 3.

In Step S51, the driving assistance ECU 11 reads an accelerator operation amount θacc detected by the accelerator operation amount sensor 14. In Step S52, the driving assistance ECU 11 sets a drive force corresponding to the accelerator operation amount θacc. The driving assistance ECU 11 transmits a drive signal corresponding to the drive force to the drive source actuator 33, and terminates the routine.

The drive source actuator 33 causes the drive source 2 to generate the drive force. The drive force is transmitted to the transmission (manual transmission) 4 via the clutch 3 and is transmitted to the driving wheels 9 while the speed is shifted to a predetermined speed. When the drive force has a margin, the driving assistance ECU 11 causes the low-speed M/G 5 to function as a generator, and charges the battery 32 with electric power generated by the margin of the drive force.

When the transmission 4 is a manual transmission and the driver's vehicle is in a traffic jam in which the driver's vehicle speed Vs is equal to or lower than the traffic jam determination vehicle speed Vth, the driver sets the shift position of the select lever 19 to neutral (N) or disengages the clutch 3 by depressing the clutch pedal to interrupt power transmission from the drive source 2 toward the propeller shaft 6. Then, the driving of the drive source 2 is stopped and the low-speed EV mode is executed by driving the low-speed M/G 5.

When a following-target preceding vehicle is detected ahead of the driver's vehicle in the low-speed EV mode, the preceding-vehicle following control is executed through the ACC. Therefore, the driver's vehicle can automatically start and stop while following the preceding vehicle without the driver's operations for depressing the accelerator pedal and changing the shift position. Thus, it is possible to reduce the burden on the driver during operations in the traffic jam. When the driver's vehicle speed Vs is higher than the traffic jam determination vehicle speed Vth, the driver's vehicle can travel as the MT vehicle. Therefore, the driver can operate the accelerator and change the shift position as intended. Thus, the driver has good operation feeling.

Figure 6:
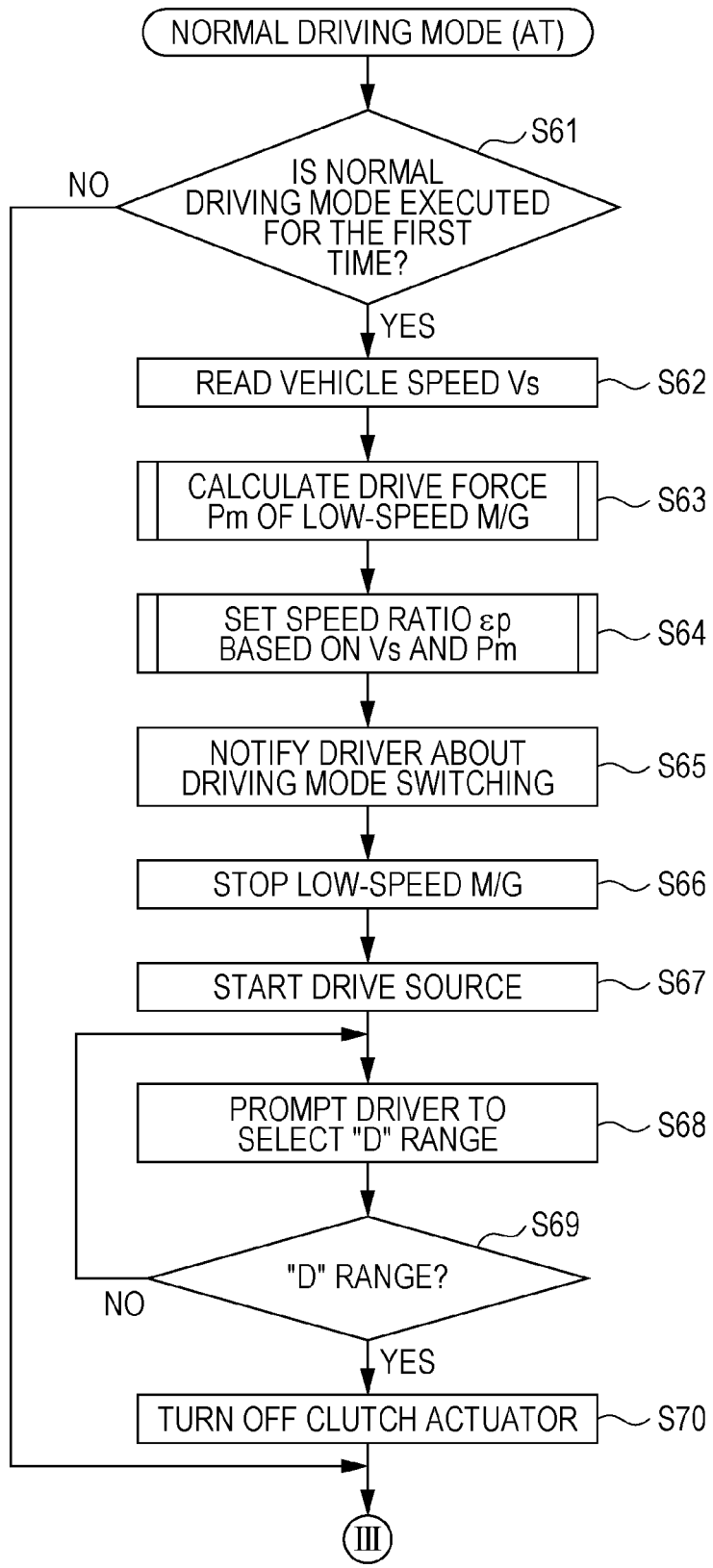
FIG. 6 is a flowchart (part 1) illustrating a normal driving mode routine in an AT vehicle.
Figure 7:
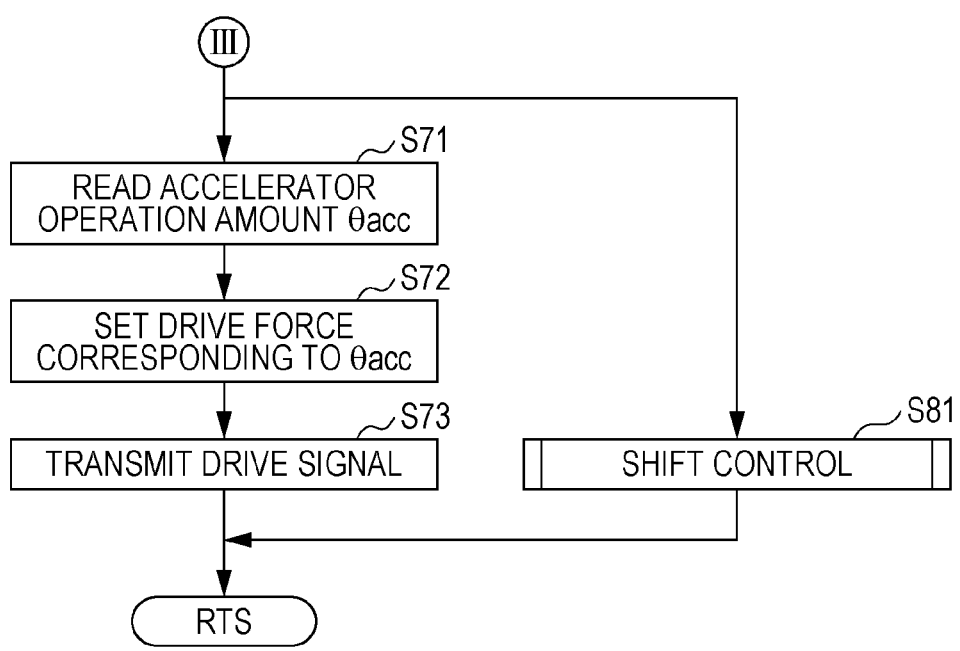
FIG. 7 is a flowchart (part 2) illustrating the normal driving mode routine in the AT vehicle.

Next, the normal driving mode to be executed by the driving assistance ECU 11 when the transmission 4 is an automatic transmission is described with reference to the normal driving mode (AT) subroutine illustrated in FIG. 6 and FIG. 7. The normal driving mode (AT) subroutine is applied in place of the normal driving mode (MT) subroutine illustrated in FIG. 4 and FIG. 5.

Processes of Steps S61 to S63 are identical to the processes of Steps S31 to S33 of FIG. 4 and description thereof is omitted. When the driving assistance ECU 11 proceeds to Step S64 from Step S63, the driving assistance ECU 11 determines an appropriate speed ratio Ep of the transmission (automatic transmission) 4 by referring to a preset map based on the driver's vehicle speed Vs and the drive force Pm of the low-speed M/G 5. In Step S65, the driving assistance ECU 11 notifies the driver about switching of the driving mode to the normal driving mode by using the monitor (not illustrated) and voice.

In Step S66, the driving assistance ECU 11 stops the low-speed M/G 5. In Step S67, the driving assistance ECU 11 starts the drive source 2. In Step S68, the driving assistance ECU 11 prompts the driver to set the select lever 19 to a drive (D) range by using monitor display and voice.

In Step S69, the driving assistance ECU 11 determines whether the select lever 19 is set to the "D" range based on a shift position detected by the position sensor 20. The driving assistance ECU 11 waits until the select lever 19 is set to the "D" range.

When the driving assistance ECU 11 detects that the select lever 19 is set to the "D" range, the driving assistance ECU 11 proceeds to Step S70. In Step S70, the driving assistance ECU 11 transmits an OFF signal to the clutch actuator 34 to engage the clutch 3. Thus, the drive source 2 and the transmission (automatic transmission) 4 are coupled via the clutch 3.

When the driver depresses the clutch pedal in the normal driving mode (AT), no drive signal is transmitted from the driving assistance ECU 11 to the clutch actuator 34 to disable the operation on the clutch 3 using the clutch pedal. Thus, the clutch 3 is constantly engaged while the vehicle is traveling in the normal driving mode.

The driving assistance ECU 11 proceeds to Steps S71 and S81. In Step S71, the driving assistance ECU 11 reads an accelerator operation amount θacc detected by the accelerator operation amount sensor 14. In Step S72, the driving assistance ECU 11 sets a drive force corresponding to the accelerator operation amount θacc. In Step S73, the driving assistance ECU 11 transmits a drive signal corresponding to the drive force to the drive source actuator 33, and terminates the routine.

The drive source 2 generates a desired drive force through the operation of the drive source actuator 33. The drive force is transmitted to the transmission (automatic transmission) 4 via the clutch 3. When the drive force has a margin, the driving assistance ECU 11 causes the low-speed M/G 5 to function as a generator, and charges the battery 32 with electric power generated by the margin of the drive force.

In Step S81, the driving assistance ECU 11 executes shift control for the transmission (automatic transmission) 4 and terminates the routine. The shift control is well known. For example, when the transmission is a continuously variable transmission, a target primary pulley rotation speed is first set by referring to a basic shift characteristic map based on an accelerator operation amount θacc and a driving condition parameter such as either one of a driver's vehicle speed Vs and a drive source rotation speed. Subsequently, the shift control is performed through following control so that an actual primary pulley rotation speed converges on the target primary pulley rotation speed.

When the transmission 4 is an automatic transmission, the drive source 2 and the transmission (automatic transmission) 4 are coupled via the clutch 3. In a traffic jam in which the driver's vehicle speed Vs is equal to or lower than the traffic jam determination vehicle speed Vth, the driver disengages the clutch 3 by depressing the clutch pedal or sets the shift position of the select lever 19 to neutral (N) to interrupt power transmission from the drive source 2 toward the propeller shaft 6. Then, the driving of the drive source 2 is stopped and the low-speed EV mode is executed by driving the low-speed M/G 5.

When the driver sets the shift position to neutral during a stop, the driving mode is switched to the low-speed EV mode. Therefore, the vehicle can smoothly start even if the driver releases the force for depressing the brake pedal while forgetting to return the shift position to the "D" range. As a result, the driver can feel safe without being upset.

The embodiment of the disclosure is not limited to the embodiment described above. For example, when the driving wheels 9 illustrated in FIG. 1 are rear wheels, the low-speed M/G 5 may be an in-wheel motor provided to each front wheel. As long as the low-speed M/G 5 is located on a downstream side of the clutch 3, the low-speed M/G 5 may be provided at any position out of an upstream side of the transmission 4, the inside of the transmission 4, a part of the propeller shaft 6, and the inside of the differential gearbox 7. The clutch operator may be a clutch switch to be operated with a hand.

Effects

According to the embodiment of the disclosure, when the controller detects that the clutch is disengaged or the transmission is neutral, the controller sets the driving mode to the motor driving mode to stop the drive source and start the low-speed motor. Therefore, the drivers of both the MT vehicle and the AT vehicle can drive their vehicles by using the low-speed motors in a traffic jam. Thus, burdens on the drivers during operations can be reduced.

In the driving assistance apparatus according to the embodiment of the disclosure, when the driving mode setter sets the driving mode to the normal driving mode and the controller determines that the drive force of the drive source has a margin, the controller may cause the low-speed motor to function as a generator, and charge the battery with electric power generated by the margin of the drive force.

The driving assistance ECU 11 illustrated in FIG. 1 can be implemented by circuitry including at least one semiconductor integrated circuit such as at least one processor (e.g., a central processing unit (CPU)), at least one application specific integrated circuit (ASIC), and/or at least one field programmable gate array (FPGA). At least one processor can be configured, by reading instructions from at least one machine readable tangible medium, to perform all or a part of functions of the driving assistance ECU 11. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the non-volatile memory may include a ROM and a NVRAM. The ASIC is an integrated circuit (IC) customized to perform, and the FPGA is an integrated circuit designed to be configured after manufacturing in order to perform, all or a part of the functions of the modules illustrated in FIG. 1.

The invention claimed is:

1. A driving assistance apparatus for a vehicle, the driving assistance apparatus comprising:
   a clutch disposed between a drive source and a transmission;
   a clutch operator operable to disengage the clutch;
   a clutch operation detector configured to detect that the clutch is disengaged by the clutch operator;
   a shift operator operable to set the transmission at least to a neutral position;
   a shift position detector configured to detect that the transmission is in the neutral position in response to operation of the shift operator;
   a motor; and
   a controller configured to:
      determine that the vehicle is moving and a speed of the vehicle that is moving is equal to or less than a threshold speed;
      set a driving mode of the vehicle to a motor driving mode when (1) the speed of the vehicle is equal to or lower than a threshold speed and (2) the clutch operation detector detects that the clutch is disengaged or the shift position detector detects that the transmission is in the neutral position; and
      stop the drive source and start the motor when the driving mode is set to the motor driving mode.

2. The driving assistance apparatus according to claim 1, wherein the transmission is an automatic transmission, wherein the controller is further configured to set the driving mode to a normal driving mode when the clutch operation detector detects that the clutch is engaged or the shift position detector does not detect that the transmission is in the neutral position, and wherein the controller is configured to stop the motor, start the drive source, and disable the clutch operator from disengaging the clutch when the driving mode is set to the normal driving mode.

3. The driving assistance apparatus according to claim 1, wherein the transmission is a manual transmission, wherein the controller is further configured to set the driving mode to a normal driving mode when the clutch operation detector detects that the clutch is engaged or the shift position detector does not detect that the transmission is in the neutral position, and wherein the controller is configured to stop the low-speed motor and start the drive source when the driving mode is set to the normal driving mode.

4. The driving assistance apparatus according to claim 1, wherein the controller is configured to execute preceding-vehicle following control to cause the vehicle to follow a preceding vehicle when the driving mode is set to the motor driving mode.

5. The driving assistance apparatus according to claim 2, wherein the controller is configured to execute preceding-vehicle following control to cause the vehicle to follow a preceding vehicle when the driving mode is set to the motor driving mode.

6. The driving assistance apparatus according to claim 3, wherein the controller is configured to execute preceding-vehicle following control to cause the vehicle to follow a preceding vehicle when the driving mode is set to the motor driving mode.

7. The driving assistance apparatus according to claim 1, further comprising a vehicle speed detector configured to detect a vehicle speed of the vehicle,
wherein the controller is further configured to set the driving mode to the motor driving mode when the clutch operation detector detects that the clutch is disengaged or the shift position detector detects that the transmission is in the neutral position and the vehicle speed detected by the vehicle speed detector is equal to or lower than a traffic jam determination vehicle speed.

8. The driving assistance apparatus according to claim 2, further comprising a vehicle speed detector configured to detect a vehicle speed of the vehicle,
wherein the controller is further configured to set the driving mode to the motor driving mode when the clutch operation detector detects that the clutch is disengaged or the shift position detector detects that the transmission is in the neutral position and the vehicle speed detected by the vehicle speed detector is equal to or lower than a traffic jam determination vehicle speed.

9. The driving assistance apparatus according to claim 3, further comprising a vehicle speed detector configured to detect a vehicle speed of the vehicle,
wherein the controller is further configured to set the driving mode to the motor driving mode when the clutch operation detector detects that the clutch is disengaged or the shift position detector detects that the transmission is in the neutral position and the vehicle speed detected by the vehicle speed detector is equal to or lower than a traffic jam determination vehicle speed.

10. The driving assistance apparatus according to claim 4, further comprising a vehicle speed detector configured to detect a vehicle speed of the vehicle,
wherein the controller is further configured to set the driving mode to the motor driving mode when the clutch operation detector detects that the clutch is disengaged or the shift position detector detects that the transmission is in the neutral position and the vehicle speed detected by the vehicle speed detector is equal to or lower than a traffic jam determination vehicle speed.

11. The driving assistance apparatus according to claim 5, further comprising a vehicle speed detector configured to detect a vehicle speed of the vehicle,
wherein the controller is further configured to set the driving mode to the motor driving mode when the clutch operation detector detects that the clutch is disengaged or the shift position detector detects that the transmission is in the neutral position and the vehicle speed detected by the vehicle speed detector is equal to or lower than a traffic jam determination vehicle speed.

12. The driving assistance apparatus according to claim 6, further comprising a vehicle speed detector configured to detect a vehicle speed of the vehicle,
wherein the controller is further configured to set the driving mode to the motor driving mode when the clutch operation detector detects that the clutch is disengaged or the shift position detector detects that the transmission is in the neutral position and the vehicle speed detected by the vehicle speed detector is equal to or lower than a traffic jam determination vehicle speed.

13. A driving assistance apparatus for a vehicle, the driving assistance apparatus comprising:
a clutch disposed between a drive source and a transmission;
a clutch operator operable to disengage the clutch;
a sensor configured to detect that the clutch is disengaged by the clutch operator;
a shift operator operable to set the transmission at least to a neutral position;
a shift position detector configured to detect that the transmission is in the neutral position in response to operation of the shift operator;
a motor; and
circuitry configured to:
  determine that the vehicle is moving and a speed of the vehicle that is moving is equal to or less than a threshold speed;
  set a driving mode to a motor driving mode of the vehicle when (1) the speed of the vehicle is equal to or lower than a threshold speed and (2) the clutch operation detector detects that the clutch is disengaged or the shift position detector detects that the transmission is in the neutral position; and
  stop the drive source and start the motor when the driving mode is set to the motor driving mode.

* * * * *